(12) United States Patent
Mackulin et al.

(10) Patent No.: US 9,475,582 B2
(45) Date of Patent: Oct. 25, 2016

(54) AIRCRAFT POTABLE-WATER SYSTEM

(75) Inventors: Bryan J. Mackulin, Akron, OH (US);
Kurt M. Tauscher, Cuyahoga Falls, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1867 days.

(21) Appl. No.: 12/565,242

(22) Filed: Sep. 23, 2009

(65) Prior Publication Data

US 2010/0084030 A1 Apr. 8, 2010

Related U.S. Application Data

(60) Provisional application No. 61/102,104, filed on Oct. 2, 2008.

(51) Int. Cl.
 *B64D 11/02* (2006.01)
(52) U.S. Cl.
 CPC .......... *B64D 11/02* (2013.01); *Y10T 137/6906* (2015.04); *Y10T 137/86356* (2015.04); *Y10T 137/87845* (2015.04)
(58) Field of Classification Search
 USPC ........ 137/87.02, 119.08, 202, 587, 861, 877, 137/878, 879, 883, 899.2; 244/118.5, 244/129.1, 136, 137.1; 141/126, 199
 See application file for complete search history.

(56) References Cited

U.S. PATENT DOCUMENTS

| | | | |
|---|---|---|---|
| 4,518,010 A * | 5/1985 | Mucheyer et al. | 137/587 |
| 5,046,529 A | 9/1991 | Corella | |
| 5,251,346 A * | 10/1993 | Donati | 4/665 |
| 5,261,440 A | 11/1993 | Frank | |
| 5,303,739 A | 4/1994 | Ellgoth et al. | |
| 5,309,938 A | 5/1994 | Ellgoth et al. | |
| 5,322,099 A * | 6/1994 | Langlois | 141/307 |
| 5,404,906 A * | 4/1995 | Aoshima et al. | 137/587 |
| 5,421,040 A * | 6/1995 | Oldfelt | 4/435 |
| 5,769,124 A | 6/1998 | Ehrhardt | |
| 5,950,655 A * | 9/1999 | Benjey | 137/43 |
| 6,302,133 B1 * | 10/2001 | Kobayashi et al. | 137/43 |
| 6,378,546 B1 | 4/2002 | Hanson | |
| 6,776,183 B1 | 8/2004 | Brooker et al. | |
| 6,874,550 B2 | 4/2005 | Brooker | |
| 7,091,456 B2 | 8/2006 | Lee et al. | |
| 2004/0186634 A1 | 9/2004 | Lucky et al. | |
| 2006/0214419 A1 | 9/2006 | Heuer | |
| 2007/0051852 A1 | 3/2007 | McCoskey et al. | |
| 2009/0212161 A1 | 8/2009 | MacKulin et al. | |

* cited by examiner

*Primary Examiner* — Kevin Murphy
*Assistant Examiner* — Jonathan Waddy
(74) *Attorney, Agent, or Firm* — Cantor Colburn LLP

(57) ABSTRACT

An aircraft potable-water system (10) comprising an automatic valve (60) associated with an overflow line (50) and an automatic switch (70) associated with the storage tank (30). The switch (70) vents the storage tank (30) when it is not full, and automatically converts to a tank-pressurizing condition when the storage tank (30) is full. This conversion of the switch (70) causes the valve (60) to move to an overflow-open position so that excess potable water can be drained through the drainmast (18).

18 Claims, 4 Drawing Sheets

AIRCRAFT POTABLE-WATER SYSTEM

RELATED APPLICATION

This application claims priority under 35 U.S.C. §119(e) to U.S. Provisional Patent Application No. 61/102,104 filed on Oct. 2, 2008. The entire disclosure of this provisional patent application is hereby incorporated by reference.

BACKGROUND

An aircraft typically has one or more water stations in its cabin for selectively dispensing potable water during flight. To this end, an aircraft can have a storage tank filled with potable water and station-supply lines plumbed from the storage tank to the water station(s). The storage tank is filled between flights (i.e., when the aircraft is grounded) by connecting an external source of potable water to a ground-fill line that extends to the storage tank. Specifically, for example, ground crew connects the hose of a water service truck to the ground-fill line and allows water to flow to the storage tank.

SUMMARY

An aircraft potable-water system is provided wherein tank-filling steps do not require the manipulation of push/pull cables and/or the activation of motorized mechanics. Instead, an automatic valve moves between positions (and/or a switch converts between conditions) to coordinate the filling of the potable water storage tank. While ground crews will warmly welcome this convenience, this automatic operation can also reduce equipment costs and/or ease installation procedures. For example, push-pull cables often require complex routing, due to minimum bend-ratios and passage through pressurized bulkheads. And a motorized device necessitates a heavy motor and a connection to a power source (e.g., aircraft power or a portable runway power unit). Moreover, a separate venting device and a separate backup relief device are usually still needed to insure that the tank does not over-pressurize during flight.

These and other features of the system (and components, methods, steps associated therewith) are fully described and particularly pointed out in the claims. The following description and annexed drawings set forth in detail certain illustrative embodiments, these embodiments being indicative of but a few of the various ways in which the principles may be employed.

DRAWINGS

DESCRIPTION

Figure 1:
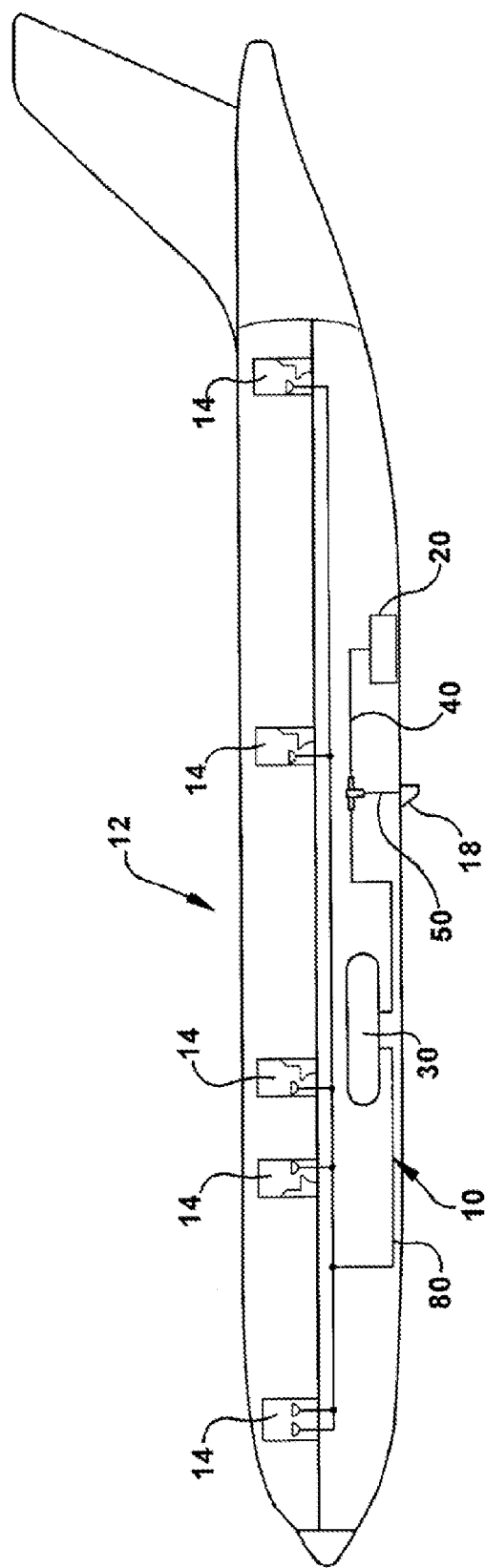
FIG. 1 is a schematic view of the potable-water system installed in an aircraft.

A potable-system 10 is shown installed in an aircraft 12 in FIG. 1. The aircraft 12 comprises one or more stations 14 (e.g., galley sinks, wash basins, dishwashers, coffee brewers, ice makers, etc.) through which potable water can be selectively dispensed during flight. The aircraft 12 also comprises a drainmast 18 (or other drain 18) through which fluids can be ejected, and an external panel 20 having a port 21 for connection to an external potable-water source.

Figure 2:
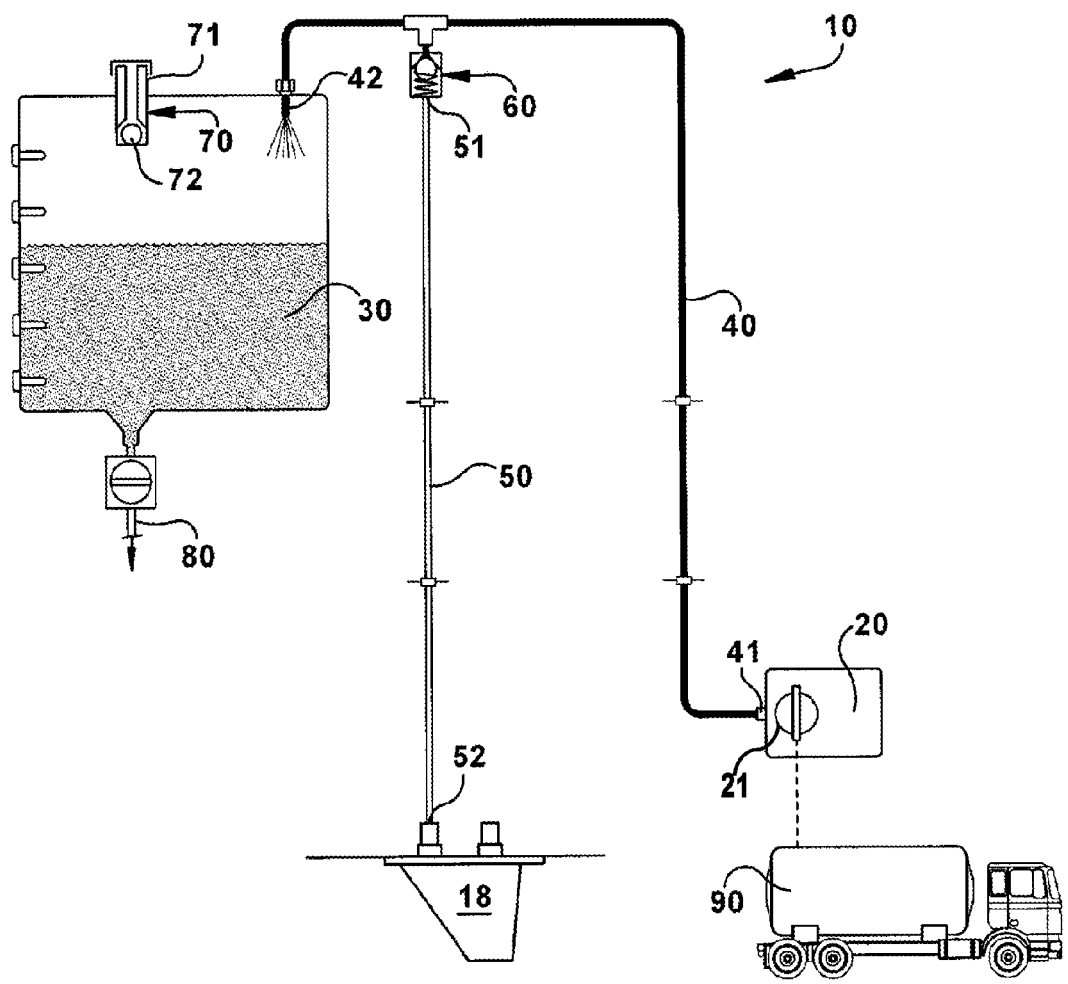
FIGS. 2-4 are schematic diagrams of the aircraft potable-water system, the system being shown in a tank-being-filled mode, a tank-full mode, and a flight mode, respectively.
Figure 3:
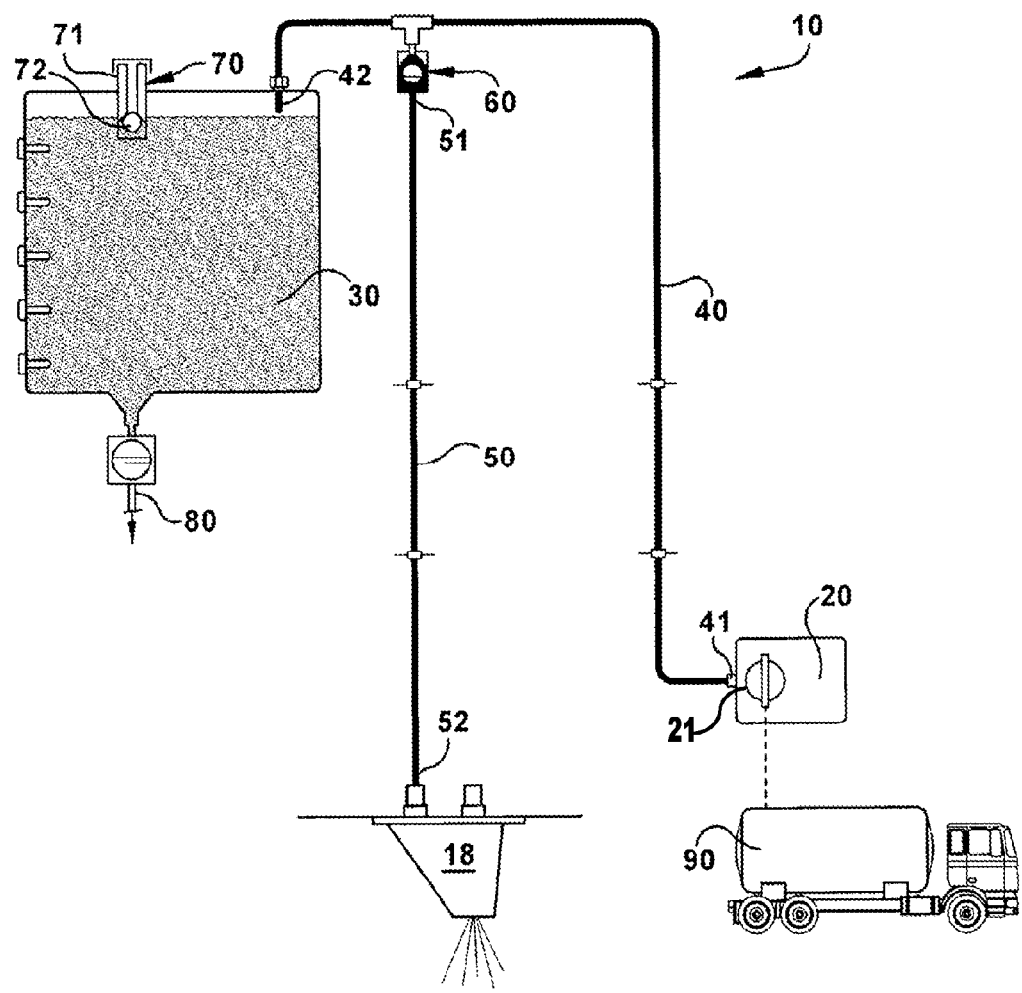
Figure 4:
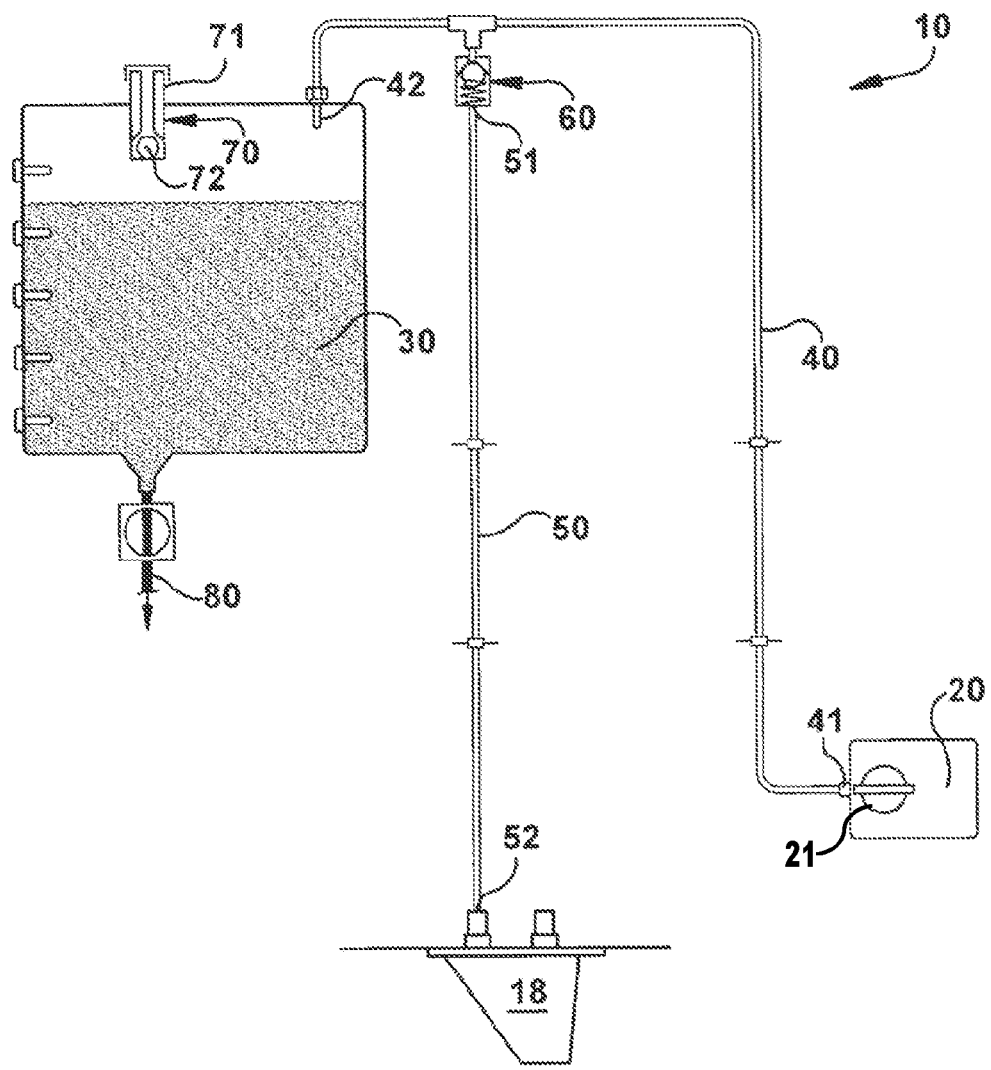

As is best seen by referring additionally to FIGS. 2-4, the potable-water system 10 comprises a storage tank 30 in which potable water is stored for use at the stations 14 during flight. The system 10 also comprises a ground-fill line 40 and an overflow line 50. The upstream end 41 of the ground-fill line 40 communicates with the port 21 on the panel 20 and its downstream end 42 communicates with storage tank 30. The upstream end 51 of the overflow line 50 can communicate with the ground-fill line 40 (as shown) and/or the storage tank 30. The downstream end 52 of the overflow line 50 communicates with the drainmast 18. While the lines 40 and 50 are schematically shown as single conduits, they can be tubes, pipes, or other plumbing (with valves, throttles, sensors, gauges, etc. integrated therein), that conveys potable water in the system 10.

The system 10 also comprises an automatic valve 60 and an automatic switch 70. The term "automatic" in the present context means that the conditions within the potable-water system 10 (e.g., water level, tank pressure, etc.) causes conversion, movement, translation, or other changes in a component without manual or electrical interaction with equipment within the aircraft 12. In other words, for example, cables do not have to be manipulated, a motor does not have to powered, and/or a valve does not have to be energized, in order for the valve 60 and/or the switch 70 to perform the requisite conversion or movement.

The valve 60 automatically moves between an overflow-open position whereat potable water is not blocked from draining through the drainmast 18 and an overflow-closed position whereat potable water is blocked from draining through the drainmast 18. The switch 70 automatically converts between a full condition when the storage tank 30 is full and a not-full condition when the storage tank 30 is not full. In the illustrated system 10, the conversion of the switch 70 to its full condition causes the valve 60 to move to its overflow-open position so that potable water can drain through the drain 18.

The valve 60 can be a pressure-activated device (e.g., a pressure relief valve) that automatically closes upon the tank 30 reaching a predetermined pressure.

The switch 70 can sense the water level in the tank 30 and convert to its full condition when the water reaches a predetermined level corresponding to the storage tank 30 being full. For example, as illustrated, the switch 70 can comprise a sleeve 71 that provides a top vent opening when the switch 70 is in its not-full condition. A float 72, situated within the sleeve 71, can be lifted by the water once it reaches a near-full level in the tank 30. This lifting will continue until the float 72 reaches the top of the sleeve 71 and closes the vent opening, thereby causing pressure to rise within the tank 30.

The potable-water system 10 can further comprise a station-supply line 80 plumbed to the station(s) 14 to provide potable water thereto.

In FIG. 2, the aircraft 12 is grounded and the storage tank 30 is being filled with potable water from an external source 90 through the ground-fill line 40. The switch 70 is in its not-full condition whereby the air pocket above the tank's water level is allowed to continuously vent. Because the tank 30 is not pressurized (e.g., it is constantly venting), the valve 60 remains in its overflow-closed position whereby potable water is prevented from draining through the drainmast 18.

In FIG. 3, the aircraft 12 is still grounded, but the storage tank 30 is now full and the switch 70 is automatically converted to its full condition. This pressurizes the tank 30 and, at a predetermined pressure, the valve 60 is automatically moved to its overflow-open position. The valve's movement opens the overflow line 50 whereby excess potable water from the external source 90 drains through the drainmast 18. The water draining on the runway signals ground crew that the storage tank 30 is full so that the supply of water from the external-source can be shutoff. Thereafter, the external potable-water source 90 can be disconnected from the line 40 in preparation for flight.

In FIG. 4, the aircraft 12 is in flight and potable water is being dispensed at the water stations 14. The switch 70 is in its venting condition and can function as the tank's venting component. The valve 60 is in its overflow-closed position and can function as the tank's backup pressure-relief component. Thus, separate components are not necessary to insure that the tank 30 does not over-pressurize during flight. The valve 60 can be set to activate at a pressure difference greater than the pressure difference corresponding to the maximum expected aircraft altitude and the expected minimum cabin pressure.

Thus, the potable-water system 10 comprises a valve 60 that automatically moves to an overflow position when the storage tank 30 is full, thereby allowing the excess water to be ejected through the drainmast 18. The valve's automatic movement to the overflow position can be motivated by a switch, such as switch 70 that automatically converts when the tank 30 is full. For example, as illustrated, the switch 70 can be a float-comprising contraption and the valve 60 can be a pressure-activated device (e.g., a pressure relief valve).

Although the invention has been shown and described with respect to certain preferred embodiments, it is evident that equivalent and obvious alterations and modifications will occur to others skilled in the art upon the reading and understanding of this specification. The present invention includes all such alterations and modifications and is limited only by the scope of the following claims.

The invention claimed is:

1. An aircraft potable-water system comprising:
    a storage tank that is full when it contains a set amount of potable water and not full when it contains less than this amount;
    a ground-fill line having an upstream end adapted for connection to an external potable-water source and a downstream end communicating with the storage tank;
    an overflow line having an upstream end communicating with the storage tank and/or the ground-fill line and a downstream end communicating with a drain;
    a valve movable between an overflow-open position whereat potable water is not blocked from draining through the drain and an overflow-closed position whereat potable water is blocked from draining through the drain; and
    wherein the valve automatically moves and/or remains in its overflow-open position when storage tank is full and automatically moves and/or remains in its overflow-closed position when the storage tank is not full, this automatic movement being caused without manual or electrical interaction with the valve; and
    wherein the drain is a drainmast.

2. An aircraft potable-water system as set forth in claim 1, further comprising a switch that automatically converts between a full condition when the storage tank is full and a not-full condition when the storage tank is not full; wherein the conversion of the switch to the full condition causes the valve to move to its overflow-open position so that potable water can drain through the drain.

3. An aircraft potable-water system as set forth in claim 2, wherein the switch senses the level of the potable water contained in the tank and converts to its full condition when the potable water reaches a predetermined level corresponding to the storage tank being full.

4. An aircraft potable-water system as set forth in claim 3, wherein the switch comprises a sleeve that is sealed when the switch is in its full condition and a vent opening when the switch is in its not-full condition.

5. An aircraft potable-water system as set forth in claim 4, wherein a float is movable between a lower location and an upper location, and wherein the float is in its upper location when the switch is in its full condition.

6. An aircraft potable-water system as set forth in claim 5, wherein the float is lifted by potable water within the storage tank to the upper location.

7. An aircraft potable-water system as set forth in claim 1, wherein an upstream end of the overflow line communicates with the storage tank.

8. An aircraft potable-water system as set forth in claim 1, wherein the upstream end of the overflow line communicates with the ground-fill line.

9. An aircraft potable-water system as set forth in claim 1, wherein the valve is a pressure-activated valve that automatically closes upon the tank reaching a predetermined pressure.

10. An aircraft comprising a drainmast and a potable-water system as set forth in claim 1, wherein the downstream end of the overflow line is connected to the drainmast for ejection of tank-overflow water therethrough.

11. An aircraft as set forth in claim 10, comprising a water station for dispensing potable water during flight, wherein the potable-water system further comprises a water supply line extending from the storage tank to the water station.

12. A method of filling the storage tank of the aircraft set forth in claim 10 with potable water, said method comprising the steps of: connecting the upstream end of the ground-fill line to an external potable-water source; allowing potable water from the external source to flow through the ground-fill line to the storage tank; and stopping the flow of potable water from the external source when potable water is ejected through the drainmast.

13. A method as set forth in claim 12, further comprising the step of disconnecting the upstream end of the ground-fill line from the external potable-water source.

14. A method as set forth in claim 12, characterized by the absence of non-automatic adjustment of an overflow-line-associated valve within the aircraft.

15. A method as set forth in claim 12, wherein said steps are performed while the aircraft is grounded.

16. An aircraft potable-water system as set forth in claim 1, comprising:
    a storage tank that is full when it contains a set amount of potable water and not full when it contains less than this amount;
    a ground-fill line having an upstream end adapted for connection to an external potable-water source and a downstream end communicating with the storage tank;
    an overflow line having an upstream end communicating with the storage tank and/or the ground-fill line and a downstream end communicating with a drain;
    a valve movable between an overflow-open position whereat potable water is not blocked from draining through the drain and an overflow-closed position whereat potable water is blocked from draining through the drain; and
    wherein the valve automatically moves and/or remains in its overflow-open position when storage tank is full and automatically moves and/or remains in its overflow-closed position when the storage tank is not full, this automatic movement being caused without manual or electrical interaction with the valve; and wherein the valve is set so as to not open at cabin pressure when the aircraft is in flight.

17. An aircraft potable-water system as set forth in claim 16, wherein the drain is a drainmast.

18. An aircraft potable-water system comprising:

a storage tank that is full when it contains a set amount of potable water and not full when it contains less than this amount;

a ground-fill line having an upstream end adapted for connection to an external potable-water source and a downstream end communicating with the storage tank;

an overflow line having an upstream end communicating with the storage tank and/or the ground-fill line and a downstream end communicating with a drain;

a valve movable between an overflow-open position whereat potable water is not blocked from draining through the drain and an overflow-closed position whereat potable water is blocked from draining through the drain; and wherein the valve automatically moves and/or remains in its overflow-open position when storage tank is full and automatically moves and/or remains in its overflow-closed position when the storage tank is not full, this automatic movement being caused without manual or electrical interaction with the valve; and wherein the valve is set to activate at a pressure difference greater than the pressure difference corresponding to the maximum expected altitude of the aircraft and the expected minimum cabin pressure.

\* \* \* \* \*